United States Patent [19]
Hoffman

[11] 3,993,173
[45] Nov. 23, 1976

[54] ELECTRICALLY OPERATED DISK BRAKE

[75] Inventor: Neil R. Hoffman, Saukville, Wis.

[73] Assignee: Kelsey-Hayes Company, Romulus, Mich.

[22] Filed: Sept. 11, 1972

[21] Appl. No.: 288,136

[52] U.S. Cl............................ 188/138; 188/72.2; 188/206 R
[51] Int. Cl.² ........................................ F16D 65/34
[58] Field of Search................ 188/72.2, 70 R, 138, 188/206 R

[56] References Cited
UNITED STATES PATENTS

| | | | |
|---|---|---|---|
| 2,555,664 | 6/1951 | Stocker................................ | 188/138 |
| 2,649,941 | 8/1953 | Doebeli........................... | 188/138 X |
| 3,677,375 | 7/1972 | Wolf..................................... | 188/138 |
| 3,708,040 | 1/1973 | Hollnagel........................... | 188/72.2 |

Primary Examiner—Duane A. Reger
Attorney, Agent, or Firm—Harness, Dickey & Pierce

[57] ABSTRACT

Two embodiments of electrically operated disk type brakes. In each embodiment the electric operator includes an electromagnet that is supported contiguous to the rotor and which, when actuated, moves axially into engagement with the rotor and rotates slightly with it. Means including tilting pin operators interconnect the electromagnet with the brake pads for actuating the brake pads in response to rotation of the electromagnet with the rotor. In one embodiment an improved connection is provided between the electromagnet and one brake pad that accommodates for changes in the degree of lining wear of the brake pads. In the other embodiment an arrangement is provided to balance the forces on the electromagnet and eliminate uneven wear.

10 Claims, 13 Drawing Figures

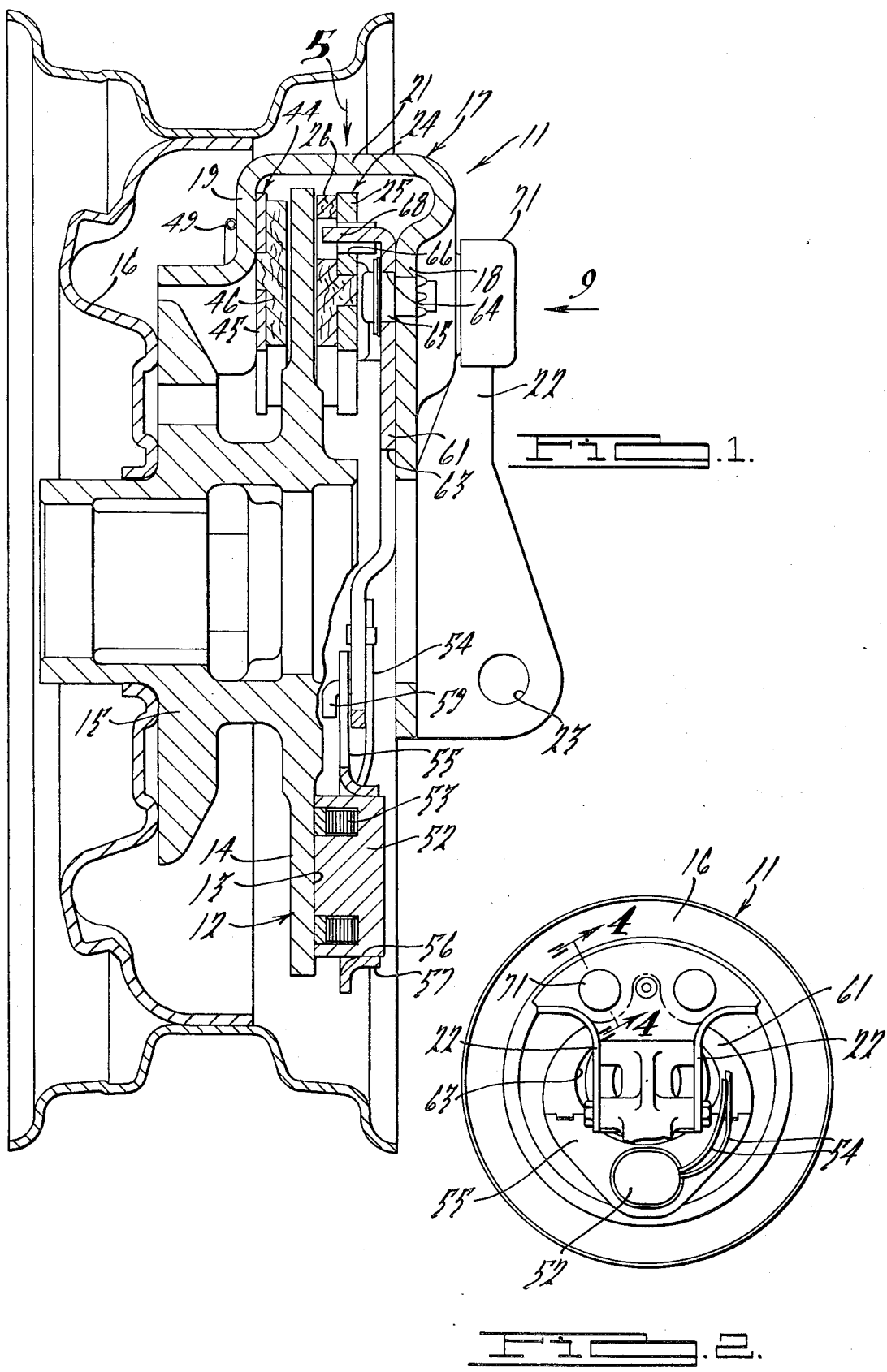

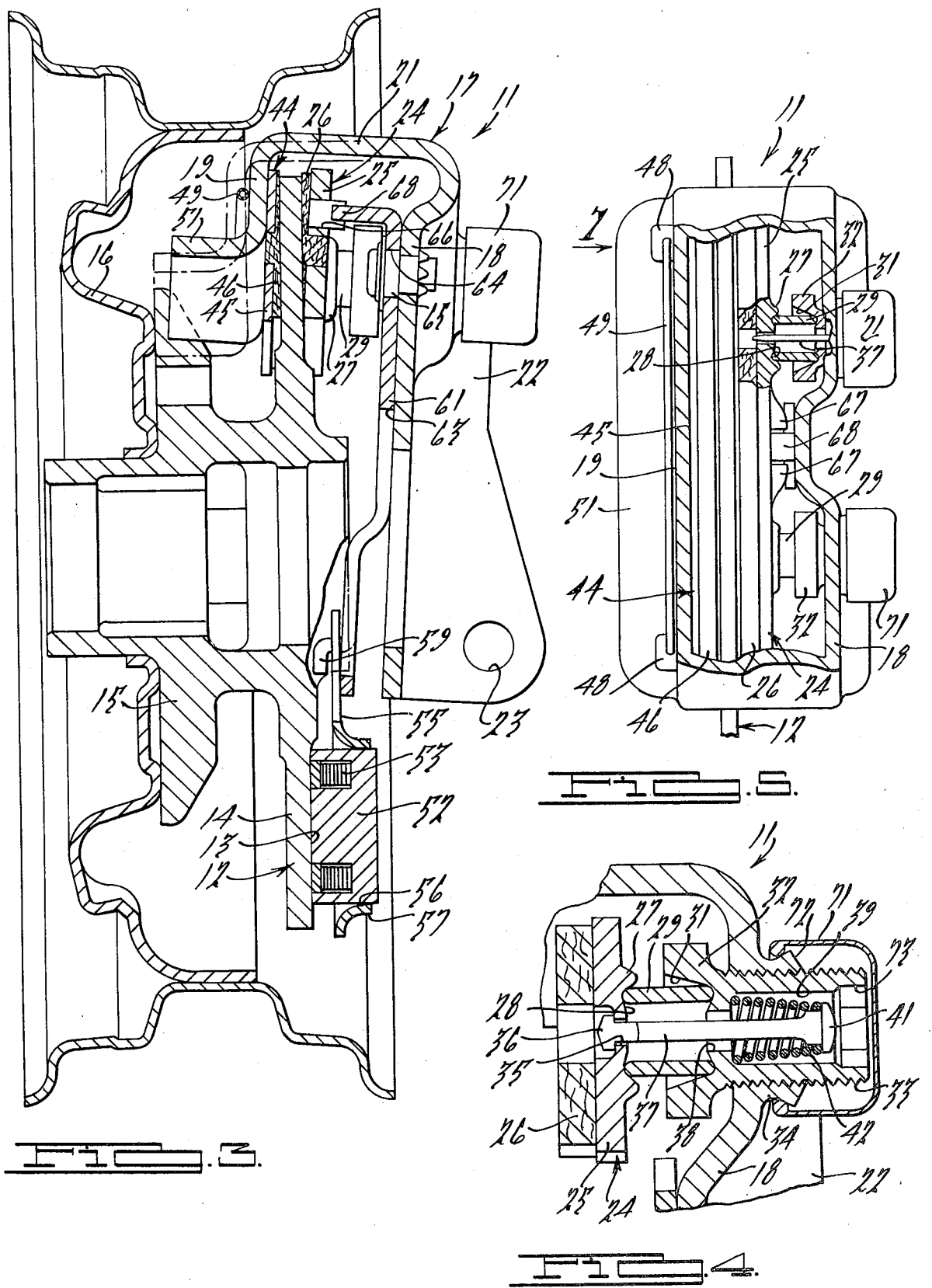

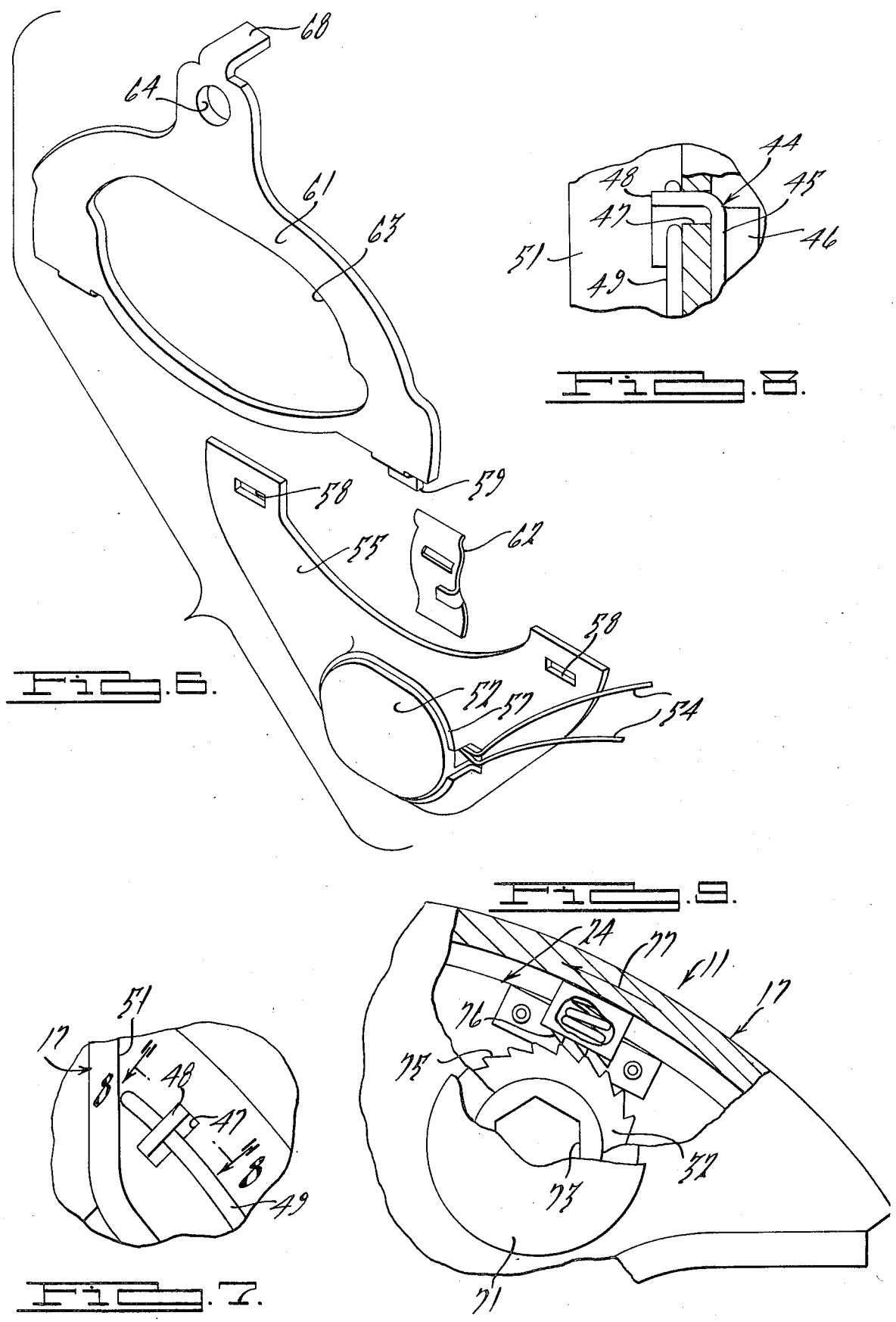

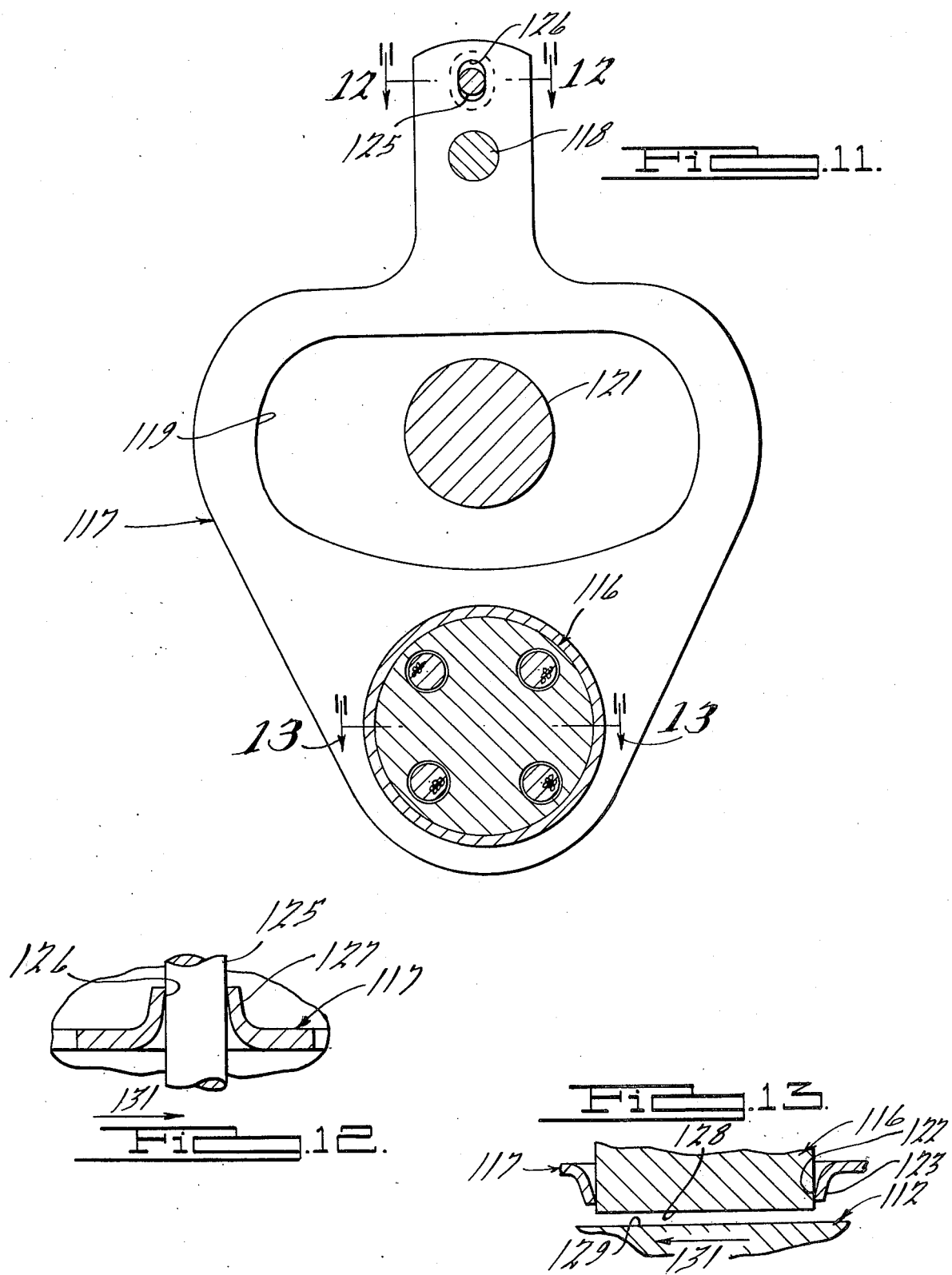

ELECTRICALLY OPERATED DISK BRAKE

BACKGROUND OF THE INVENTION

This invention relates to a disk brake assembly and more particularly to an improved, electrically operated disk brake and an actuating electromagnetic assembly therefor.

Electrically operated brake assemblies have been proposed. In these brakes an electric motor or solenoid is employed for actuating the brake shoes. Most conventional electric brakes are similar in construction to a hydraulic brake with the electric solenoid actuator replacing the fluid motor. However, electric motors or solenoids normally do not provide sufficient actuating force and some form of self-energization is required in the brake assembly. This necessity, coupled with the inherent lack of self-energization of disk brakes has resulted in a lack of commercially successful electrically operated disk brake designs. This is unfortunate because of the desirability of this type of brake.

It is, therefore, a principal object of this invention to provide an improved disk brake assembly.

It is another object of this invention to provide an improved, electrically operated disk brake assembly that embodies self-energization.

It is a further object of this invention to provide a low cost electrically operated disk brake.

The actuating mechanism for the brake includes an electromagnet and a supporting assembly that interconnects the magnet with the brake pads for their actuation. In order to reduce the cost of the assembly it is a further object of this invention to provide an improved and simplified arrangement for connecting the electromagnet to its supporting member.

In a disk brake assembly a member is juxtaposed to the rotor braking surface and has a surface that extends for substantially less than th full circumferential extent of the rotor braking surface. This member is adapted to be moved into engagement with the rotor braking surface. For example, in an electrically actuated brake of the type previously described, the member may comprise the electromagnet. The member may be moved for limited circumferential movement as well as for axial movement. Upon engagement with the rotor braking surface the rotation of the rotor exerts a twisting force on the member. This twisting force can result in unequal wear along the face of the member that engages the rotor braking surface.

It is, therefore, a further object of this invention to provide an arrangement for reducing unequal wear on a member that engages the surface of a rotor in a disk brake.

It is a further object of the invention to provide an improved electrically operated disk brake assembly that includes means for precluding unequal wear on the face of the electromagnet.

SUMMARY OF THE INVENTION

A first feature of this invention is adapted to be embodied in an electrically operated disk brake assembly that brakes the rotation of a rotor having an annular braking surface disposed generally in a plane perpendicular to its axis of rotation. An electromagnetic element is juxtaposed to the rotor and is supported for movement relative to the rotor in a direction having at least a component parallel to the axis of the rotor and for at least limited rotation with the rotor about its axis. Actuating means selectively generate an electromagnetic force for moving the electromagnetic element and the rotor axially relative to each other for affecting limited rotation of the electromagnetic with the rotor. A brake pad is supported for movement relative to the rotor braking surface and means are provided for transmitting movement of the electromagnetic element into movement of the brake pad axially into engagement with the rotor braking surface.

Another feature of the invention is adapted to be embodied in a disk brake assembly that brakes the rotation of an associated rotor. Such a disk brake assembly includes a member that is juxtaposed to an associated braking surface of the rotor and which extends for substantially less than the full circumferential extent of the rotor braking surface. The member is axially movable into engagement with the rotor braking surface and engagement with the rotor braking surface exerts a twisting force on the member in the direction of rotor rotation. The invention comprises providing means for exerting a twisting force on the member in an opposite direction to minimize unequal wear on the member.

BRIEF DESCRIPTION OF THE DRAWINGS

FIG. 1 is a cross sectional view of a disk brake assembly incorporating a first embodiment of this invention and an associated vehicular wheel taken through the axis of rotation.

FIG. 2 is a side elevational view, on a reduced scale, of the wheel and brake assembly shown in FIG. 1.

FIG. 3 is a cross sectional view, in part similar to FIG. 1, showing the brake components after the brake pad linings have undergone considerable wear.

FIG. 4 is an enlarged cross sectional view, on substantially the same scale as FIGS. 1 and 3, taken along the line 4—4 of FIG. 2.

FIG. 5 is a top view of the brake assembly, taken generally in the direction of the arrow 5 in FIG. 1, with portions broken away to more clearly show the construction.

FIG. 6 is an exploded perspective view of the electromagnetic brake actuating mechanism.

FIG. 7 is a view taken generally in the direction of the arrow 7 in FIG. 5.

FIG. 8 is a cross sectional view taken along the line 8—8 of FIG. 7.

FIG. 9 is an enlarged view, with portions broken away, of the automatic adjusting mechanism of the brake and is taken generally in the direction of the arrow 9 of FIG. 1.

FIG. 11 is a cross sectional view taken along the line 11—11 of FIG. 10.

FIG. 12 is an enlarged cross sectional view taken along the line 12—12 of FIG. 11.

FIG. 13 is a cross sectional view taken along the line 13—13 of FIG. 11.

DETAILED DESCRIPTION OF THE PREFERRED EMBODIMENTS

Embodiment of FIGS. 1–9

Figure 10:
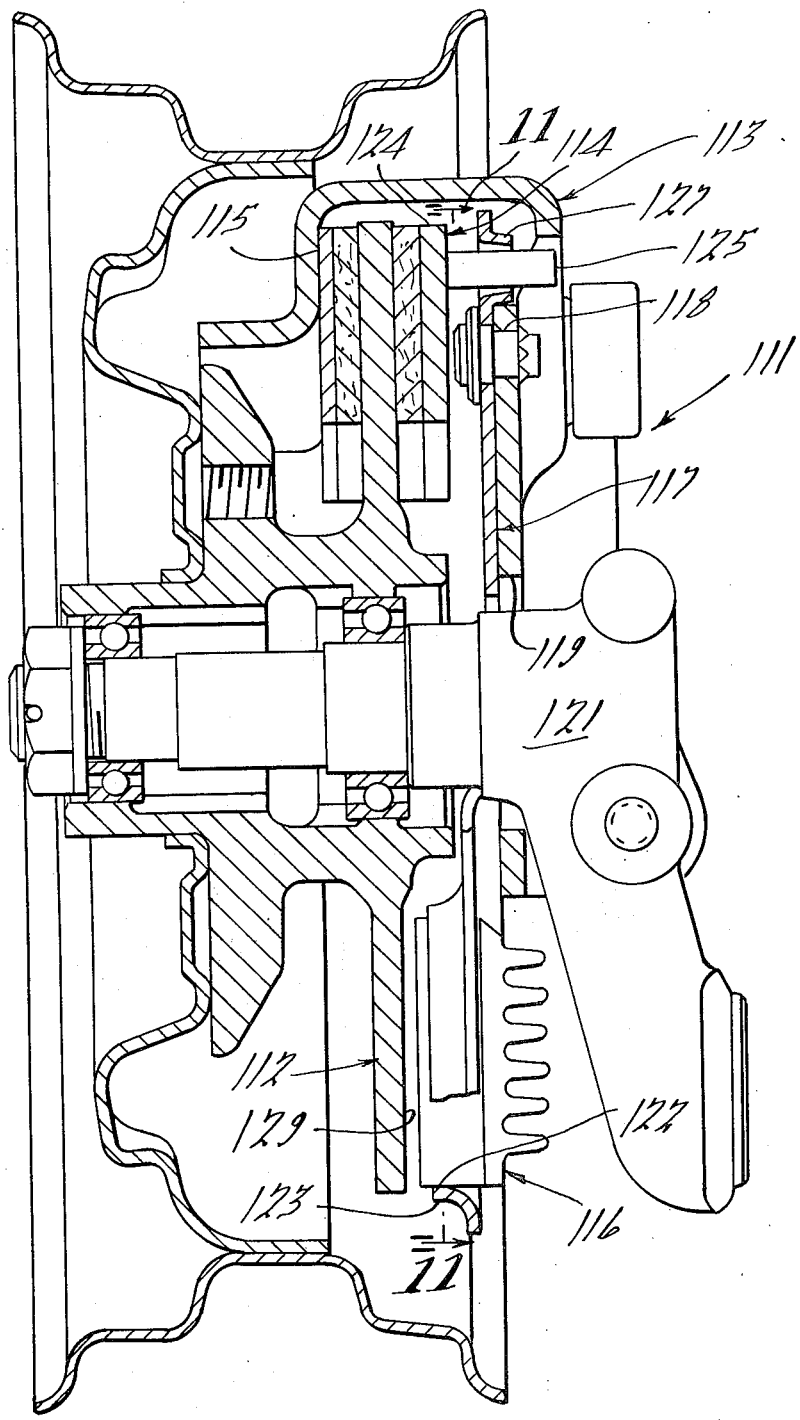
FIG. 10 is a cross sectional view, in part similar to FIG. 1, showing a disk brake assembly incorporating a second embodiment of the invention.

A disk brake assembly embodying this invention is identified generally by the reference numeral 11. The brake assembly 11 is adapted to brake the rotation of an associated rotor 12 having oppositely disposed, annular braking surfaces 13 and 14. The rotor 12 has an integral hub 15 that receives bearings (not shown) for rotatably supporting the rotor 12 in a known manner. A vehicular wheel 16 is affixed for rotation with the rotor 12 in any known manner.

The brake assembly 11 is formed from a plurality of pieces, primarily sheet metal stampings. These pieces include a caliper, indicated generally by the reference numeral 17, that has leg portions 18 and 19 that are disposed adjacent the rotor braking surfaces 13 and 14, respectively. The leg portions 18 and 19 are integrally connected by a web portion 21 that extends across the outer periphery of the rotor 12 at the radial outer terminations of the leg portions 18 and 19.

The leg portion 19 is reinforced and supported by integral rearwardly extending flanges 22 that are formed at its opposite sides. The flanges 22 are apertured, as at 23 to pass a pivot pin (not shown) that is fixed to any conventional portion of the associated vehicle for pivotally supporting the caliper 17.

A first brake pad, indicated generally by the reference numeral 24 is interposed between the caliper leg 18 and the rotor braking surface 13. The brake pad 24 includes a sheet metal backing plate 25 to which is affixed a frictional lining material 26 in any known manner such as by bonding, riveting or the like. The backing plate 25 has a pair of circumferentially spaced annular projections 27 (FIGS. 1 and 5). The projections 27 define pockets 28 that receive one end of a hollow tilting pin or tube 29. The other end of the tilting pin 29 is received in a pocket 31 formed by an adjusting member 32. The adjusting member 32 has male threads 33 that are threaded into a female threaded opening 34 formed in the caliper leg 18 to provide an adjustment for the at rest position of the brake assembly, as will become more apparent.

Adjacent each of the projections 27 the backing plate 25 is formed with a generally flattened aperture 35 through which the flattened T-shaped head 36 of a return pin 37 extends. The return pin 37 extends through the hollow tilting pin 29 and through a somewhat diameter opening 38 formed in the adjusting member 32. Adjacent the opening 38, the adjusting member 32 is formed with a larger diameter opening 39 into which a head 41 of the return pin 37 extends. A coil spring 42 encircles the portion of the pin 37 contained within the bore 39 and bears against the head 41 for urging the brake pad 24 in a retracted direction, as will become apparent.

A second brake shoe, indicated generally by the reference numeral 44 is interposed between the caliper leg 19 and the rotor braking surface 14. The second brake shoe 44 includes a backing plate 45 formed from sheet metal and a frictional lining 46. The lining 46 is affixed to the backing plate 45 in any suitable manner, as by bonding, riveting or the like. The brake shoe 44 is affixed relative to the caliper leg 19. To accomplish this, the caliper leg 19 is formed with a pair of circumferentially spaced apertures 47 (FIGS. 7 and 8) through which rearwardly extending flanges 48 formed at the opposite ends of the backing plate 45 extend. The flanges 48 are apertured at a position that lies adjacent the outer periphery of the caliper leg 19 and receive a single spring clip 49. The ends of the spring clip 49 are juxtaposed to an offset flange 51 of the caliper leg 19 so as to prevent accidental disassembly. This arrangement holds the brake pad 44 axially and circumferentially relative to the caliper leg 19. Convenient replacment is, however, permitted.

The brake assembly is actuated electrically by means including an electromagnet 52 that is juxtaposed to the rotor braking surface 13 diametrically opposite to the brake pad 24. The electromagnet 52 includes a ferromagnetic core and a winding 53. Terminals 54 (FIG. 6) extend from the winding 53 for energization in any suitable manner.

The electromagnet 52 coacts with the rotor 12, which is also formed from a ferromagnetic material, and is supported for both axial and circumferential movement relative to the rotor 12. This supporting arrangement includes a first sheet metal lever 55 having a generally bifurcated configuration. An aperture 56 is formed in the lever 55 and is defined by an outwardly bent flange 56 that extends parallel to the axis of rotation of the rotor 12 and in a direction away from the rotor braking surface 13. The electromagnet 52 has a complementary shape to the aperture 56 and is press fit into the aperture from the face opposite to the flange 57. As a result of this press fitting, the electromagnet 52 is rigidly retained within the sheet metal lever 55 and cannot become disassembled from it.

The bifurcated arms of the lever 55 are formed with slotted openings 58. The openings 58 receive offset tabs 59 of a second sheet metal supporting lever 61. Specifically formed spring clips 62 hold the lever 55 assembled to the lever 61. These spring clips, however, permit the levers 55 and 61 to pivot slightly relative to each other, for a reason which will become more apparent as this description proceeds.

The lever 61 is formed with an opening 63 that passes the axle or spindle (not shown) of the associated vehicle. A smaller diameter opening 64 is positioned adjacent the brake pad 24 and receives a pivot pin 65 that is staked or otherwise secured to the caliper leg 18. The pivot pin 65 pivotally journals the levers 61 and 55 for rotation about a pivot axis defined by a pin 65 and apertures 64.

An aperture 66 is formed in the backing plate 25 of the brake pad 24 by a pair of outwardly extending embossments 67 (FIG. 5). An inwardly turned tang 68 of the lever 61 extends into the aperture 66 between the embossments 67.

The operation of the brake assembly may best be understood by reference to FIGS. 1, 4 and 5. These Figures illustrate the brake in a released or at rest position and before frictional linings 26 and 46 have become worn. When it is desired to actuate the brake assembly 11, the electromagnet 52 is energized to generate a magnetic field. The magnet 52 will then be drawn axially toward the rotor braking surface 13 and will, in fact, come into engagement with this surface. This axial movement is permitted by the connection between the lever 55 and the lever 61.

Upon engagement of the electromagnet 52 with the rotor braking surface 13, a frictional force will be developed which causes the electromagnet 52 to rotate in the direction of rotation of the rotor 12. This rotation causes the levers 55 and 61 to pivot about the pivot pin 65. This causes the tang 68 to traverse the aperture 66 and engage one or the other of the embossments 67. The brake shoe 24 will then be moved circumferentially in the direction of rotor rotation. When this occurs, the tilting pins 29 will pivot and exert an axial force on the brake pad 24. Simultaneously, a reactive force in the opposite direction will be exerted on the brake pad 44 through the caliper leg 19. Because the pins 29 assume an angular disposition the axial force acting on the brake pads will have a self-energizing effect.

When the brake pads 24 and 44 move into engagement with the rotor braking surfaces 13 and 14 the return pins 37 will compress the return springs 42. When the brakes are released, the return springs 42 will act through the pins 37 to provide a retractile force.

It has been noted that the caliper 19 is pivotally supported. Actual movement of the brake pads 24 and 44 into engagement with the rotor braking surfaces 13 and 14 is also pivotal. The pivotal movement, however, has a substantially axial component. As a result of this pivotal movement, however, the caliper 17 and associated components will assume a different angular position in the at rest position as the frictional linings 26 and 46 become worn. FIG. 3 shows the components in the position they assume at maximum lining wear. This difference in angle may be readily appreciated by a comparison of FIGS. 1 and 3. The electromagnet 52 should not, however, be forced to follow the pivotal movement of the caliper 17 or it will constantly rub against the rotor braking surface 14 when the degree of wear of the linings 24 and 46 reaches that shown in FIG. 3. The connection between the levers 51 and 55, aforedescribed, permits these levers to pivot relative to each other so that the lever 55 always maintains the same angular relationship to the rotor braking surface 13.

As has been noted, the adjusting members 32 may be positioned relative to the caliper 17 so as to compensate for wear of the frictional linings 26 and 46. This may be accomplished manually, by removing dust shields in the form of flexible boots 71 from flanges 72 that encircle the threaded portion 34 of the caliper leg 18. A suitable tool may then be inserted into a socket shaped opening 73 formed in each of the adjusting members 32 for rotating the adjusting member and accomplishing the adjustment.

An arrangement is provided, however, for accomplishing automatic adjustment. This mechanism is best shown in FIG. 9. The adjusting member 32 is formed with serrated ratchet teeth 75 on its outer periphery and in the area immediately adjacent the brake pad backing plate 25. A spring biased ratchet pawl 76 is carried by the backing plate 25 adjacent each of the adjusting members 32. The ratchet pawl 76 has teeth that coact with the serrated teeth 75 of the adjusting member. It will be remembered that the brake 24 moves circumferentially with the rotor 12 upon initial brake engagement. The normal direction of rotor rotation and brake pad movement is indicated by the arrow 77 in FIG. 9. The degree of this movement like the degree of axial movement of the brake pad 24 is dependent upon the degree of lining wear. When sufficient wear has been experienced, the teeth of the ratchet pawl 76 will engage the next successive serrated teeth 75 of the adjusting member 72. This occurs when the wear slightly exceeds that shown in FIG. 9. Upon the release of the brakes the brake shoe 24 will move in a direction opposite to the arrow 77 under the influence of the return springs 42. Upon this return movement, the adjusting member 32 will be rotated and its threads will cause axial movement of the adjusting member 32, the tilting pin 29 and the brake pad 24.

The Embodiment of FIGS. 10 – 13

In the previously described embodiment an arrangement was provided for supporting the actuating electromagnet so as to reduce the likelihood of uneven wear as the brake linings became worn. It has been found that this problem may be reduced if proper design criteria are met. As a practical matter, the degree of pivotal movement during the full lining lifef of the brake pads may be quite negligible. However, as the electromagnet engages the rotor braking surface, a twisting force is exerted on the electromagnet in the direction of rotor rotation. This twisting force has been found to result in tapered wear of the face of the electromagnet. The leading edge of the electromagnet wears at a faster rate than the trailing edge due to this twisting force. The embodiment of FIGS. 10 through 13 incorporates a construction for balancing the twisting forces on the electromagnet and reducing this condition.

The embodiment of FIGS. 10 through 13 is substantially similar to the embodiment of FIGS. 1 through 9. For this reason the details of the entire brake assembly will not be repeated. Only that portion of the brake which differs from the previously described embodiment will be detailed.

Referring specifically to the drawings, the second embodiment is identified generally by the reference numeral 111. This embodiment includes a rotor 112, caliper assembly 113 and brake pads 114 and 115. The brake pad 115 is affixed to the caliper 113 in a manner similar to that as in the previously described embodiment. If desired, however, the spring clip associated with the other embodiment may be eliminated. The brake pad 114 is actuated directly and the brake pad 115 is actuated reactively by means including an electromagnet assembly 116. As is in the previously described embodiment, tilting pin arrangements are interposed between the brake pad 114 and the caliper 113 for providing a servo action.

In this embodiment a sheet metal lever, indicated generally by the reference numeral 117, is pivotally supported upon the caliper 113 by a pivot pin 118. The lever 117 has a configuration as best shown in FIGS. 10 and 11 and includes an enlarged central opening 119 that clears the associated spindle 121.

The lever 117 is formed with an opening 122 that is defined by an inturned flange 123. The opening 122 is complementary in size and shape to the electromagnet 116. As in the preceding embodiment, the electromagnet 116 is press fit into the opening 122 and is retained therein by this press fit. In this embodiment, however, the flange 123 extends axially toward the rotor 112.

As in the preceding embodiment, when the electromagnet 116 is energized it will move axially into engagement with the associated braking surface of the rotor 112. The pivotal support provided by the pivot pin 118 is sufficiently loose so as to accommodate this axial movement. Upon engagement with the rotor braking surface a rotational force will be exerted upon the magnet 116 in the direction of rotor rotation. In the preceding embodiment, this rotational force was transmitted to the brake pad 114 by an offturned tang of the lever. For a reason which will become well apparent, this type of arrangement is not used in this embodiment.

The brake pad 114 includes a seet metal backing plate 124. A pin 125 is affixed, as by welding, to the backing plate 124 and extends axially away from the associated braking surface of the rotor 112. The pin 125 extends through an elongated opening 126 formed in the upper portion of the lever 117 by an out-turned flange 127. Rotation of the lever 117 thus causes the circumferential movement of the braking pad 114 to effect its actuation by the tilting pins as in the previously described embodiment.

Referring to FIG. 13 it will be noted that the electromagnet 116 has a surface 128 that is adapted to engage a corresponding surface 129 of the rotor. Assuming that the rotor is turning in the direction of the arrow 131 a twisting force will be exerted on the electromagnet 116 that causes its leading edge to dig into the rotor braking surface 129. Unless this tendency is resisted unequal wear on the surface 128 will result.

Referring now to FIG. 12, the direction of the rotor rotation is again identified by the arrow 131. When the brake pad 124 engages the rotor braking surface 129 a force will be exerted upon it tending to rotate it in the direction 131. This force is transmitted through the pin 125 and flange 127 to the lever 117. Since this engagement is on the diametrically opposite side of the pivot pin 118 this force on the lever will act in the opposite direction as that exerted on the electromagnet 116 through its engagement with the rotor braking surface. Thus, an opposing twisting force is exerted upon the electromagnet braking surface 128 to resist the uneven wear that would otherwise occur.

It is to be understood that the foregoing description is that of preferred embodiments of the invention. Various changes and modifications may be made without departing from the spirit and scope of the invention as defined by the appended claims.

I claim:

1. An electrically operated disk brake assembly for braking the rotation of an associated rotor having an annular braking surface disposed generally in a plane perpendicular to its axis of rotation, an electromagnetic element juxtaposed to said rotor, means for supporting said electromagnetic element for movement relative to the rotor in a direction having at least a component that extends parallel to the axis of rotation of the rotor and for at least limited rotation about said axis, actuating means for selectively generating an electromagnetic force for moving said electromagnetic element and the rotor axially relative to each other for limited rotation of said electromagnetic element with the rotor, a brake pad, means for supporting said brake pad for movement into engagement with the rotor braking surfaces, and means for translating rotary movement of said electromagnetic element into movement of said brake pad into engagement with the rotor braking surface, including a first lever carrying said electromagnetic element, a second lever operatively associated with the first brake pad, means for supporting said first and said second levers for simultaneous pivotal movement about an axis that extends parallel to the rotor axis and means providing an operative connection between said first and said second levers for permitting said second lever to pivot relative to said first lever about an axis that is parallel to the rotor.

2. An electrically operated disk brake assembly as set forth in claim 1 wherein the means for supporting the brake pad for movement into engagement with the rotor braking surfaces includes means for generating a self-energizing force on said brake pad upon engagement with the rotor braking surface.

3. An electrically operated disk brake assembly as set forth in claim 2 wherein the self-energizing means includes pins interposed between the brake pad and a supporting element and movable from a normal axial position into an angularly disposed position upon engagement of the brake pad with the rotor.

4. An electrically operated disk brake assembly as set forth in claim 3 wherein the means for translating the rotary movement of the electromagnet into movement of the brake pad includes means for pivoting the tilting pin.

5. An electrically operated disk brake assembly for braking the rotation of an associated rotor having oppositely facing annular braking surfaces disposed generally in planes perpendicular to its axis of rotation, an electromagnetic element juxtaposed to said rotor, means for supporting said electromagnetic element for movement relative to the rotor in a direction having at least a component that extends parallel to the axis of rotation of the rotor and for at least limited rotation about said axis, actuating means for selectively generating an electromagnetic force for moving said electromagnetic element and the rotor axially relative to each other for limited rotation of said electromagnetic element with the rotor, a caliper, means supporting said caliper for pivotal movement about an axis transversely disposed to the axis of rotation of the associated rotor, a first brake pad supported by said caliper for pivotal movement about an axis transversely disposed to the axis of rotation of the rotor and for movement into engagement with one of the rotor braking surfaces, a second brake pad affixed to said caliper and engageable with the other rotor braking surface in response to pivotal movement of said caliper about its pivot axis, and means for translating rotary movement of said electromagnetic element into movement of said first brake pad into engagement with the rotor braking surface and for generating a reactive force upon said caliper for pivoting said caliper about its pivot axis and actuating said second brake pad, the means for translating the rotary movement of the electromagnet into movement of said first brake pad including means for pivoting said first brake pad about its pivotal axis and including means for permitting such pivotal movement without accompanying pivotal movement of said electromagnetic element.

6. An electrically operated disk brake assembly as set forth in claim 1 wherein the electromagnetic element comprises an electromagnet.

7. An electrically operated disk brake assembly as set forth in claim 1 further including means for automatically adjusting the retracted position of the brake pad to compensate for wear of its frictional lining surface.

8. An electrically operated disk brake assembly as set forth in claim 1 further including a sheet metal caliper having a first leg juxtaposed to the first mentioned rotor braking surface, a second leg juxtaposed to a second braking surface of the associated rotor and an intermediate portion interconnecting said first and said second legs, the first mentioned brake pad being interposed between said first caliper leg and the first rotor braking surface, a second brake pad fixed to said second caliper leg and juxtaposed to the second rotor braking surface, means for supporting said caliper for pivotal movement about an axis disposed transversely to the rotor axis, the electromagnetic element being supported contiguous to said first caliper leg and being diametrically opposed to said first brake pad in relation to the associated first rotor braking surface.

9. An electrically operated disk brake assembly as set forth in claim 8 wherein the means for translating the pivotal movement of the levers into pivotal movement of the first brake pad of the caliper includes a pair of tilting pins interposed between said first brake pad and said caliper and means for pivoting said pins upon pivotal movement of said levers about their axis.

10. An electrically operated disk brake assembly as set forth in claim 9 wherein the first brake pad is supported for limited rotary movement about the rotor axis and the means for tilting the pins comprises a connection between the second lever and said first brake pad for rotating said brake pad upon rotation of said levers.

* * * * *